Feb. 21, 1933.  D. LANTINBERG ET AL  1,898,252
METHOD AND APPARATUS FOR THE FORMATION OF HOLLOW ARTICLES
Filed Aug. 1, 1930  4 Sheets-Sheet 1

INVENTOR.
David Lantinberg and
Frank Stefandel
BY
J. P. Warfield
ATTORNEYS.

INVENTOR.
David Lantinberg and
Frank Stefandl
BY
F. P. Warfield
ATTORNEY

Feb. 21, 1933.  D. LANTINBERG ET AL  1,898,252
METHOD AND APPARATUS FOR THE FORMATION OF HOLLOW ARTICLES
Filed Aug. 1, 1930  4 Sheets-Sheet 3

INVENTOR.
David Lantinberg and
Frank Stefandek
BY
F. P. Warfield
ATTORNEYS.

Feb. 21, 1933.   D. LANTINBERG ET AL   1,898,252
METHOD AND APPARATUS FOR THE FORMATION OF HOLLOW ARTICLES
Filed Aug. 1, 1930   4 Sheets-Sheet 4

INVENTOR.
David Lantinberg and
Frank Stefandell
BY
L. G. Warfield
ATTORNEYS.

Patented Feb. 21, 1933

1,898,252

UNITED STATES PATENT OFFICE

DAVID LANTINBERG AND FRANK STEFANDEL, OF BROOKLYN, NEW YORK, ASSIGNORS TO WIGLY CANDY COMPANY, INC., OF BROOKLYN, NEW YORK, A CORPORATION OF NEW YORK

METHOD AND APPARATUS FOR THE FORMATION OF HOLLOW ARTICLES

Application filed August 1, 1930. Serial No. 472,330.

This invention relates to methods and apparatus for forming hollow articles, and, more particularly, for forming shaped hollow articles of chocolate or other material adapted to solidify on the inner walls of a mold.

An object of the invention is to provide a simple and expeditious method for the formation of hollow articles.

Another object is to provide improved apparatus for the formation of hollow articles which apparatus is simple and sturdy in construction, economical of manufacture and assembly and easily operated, and which will efficiently accomplish the purposes for which it is intended.

Another object is to provide apparatus of the character under consideration, wherein the number and complexity of the parts are reduced to a minimum, and wherein the speed and efficiency of operation are increased to a maximum.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention reference should be had to the following detailed description taken in connection with the accompanying drawings, in which.

Figure 1:
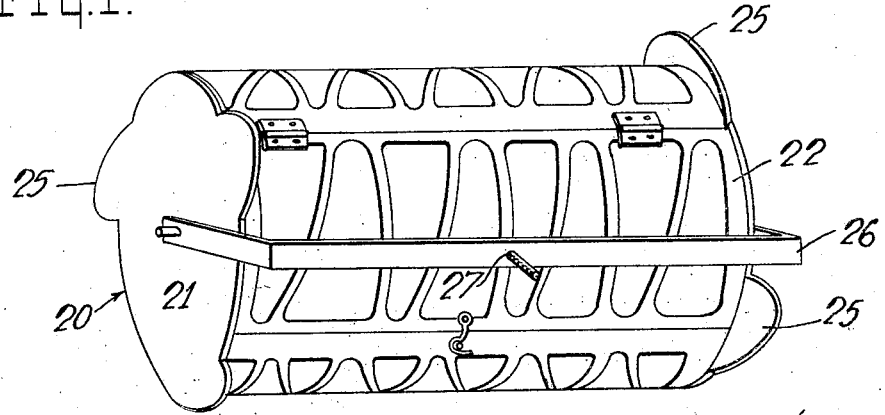
Figure 1 is a perspective view of a rotatable mold-container embodying the invention.
Figure 2:
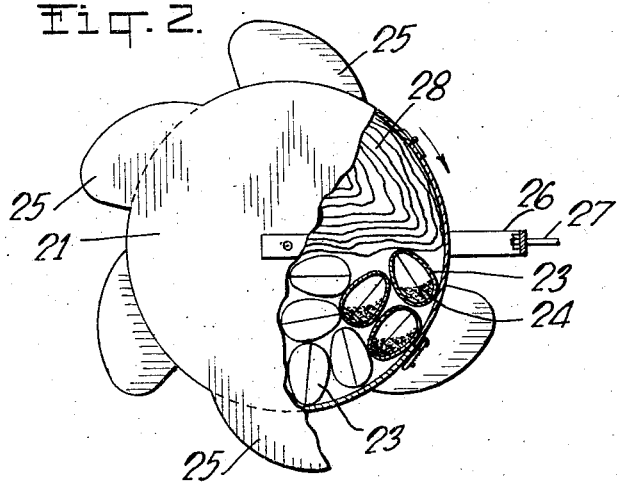
Fig. 2 is a partly sectional end view thereof.
Figure 4:
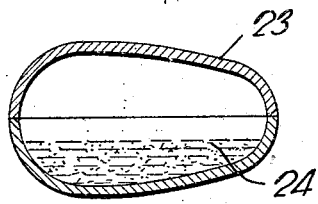
Fig. 4 is a sectional view of such a mold showing the same partially filled with liquid chocolate.

In the formation of hollow articles of chocolate and similar material it is desirable that the walls of the article be of uniform thickness. A desirable way of forming such articles is partially to fill the hollow mold with chocolate and then to subject the mold to continuous tilting actions, whereby the chocolate is uniformly spread over the inside of the mold and is allowed to harden in spread position. While it is possible to perform such tilting operations manually, or by means of various complicated mechanical contrivances, the practical difficulties in such methods, both because of the time consumed, and the lack of uniformity in the products produced have been considerable, and the present invention contemplates the provision of a method and apparatus for spreading chocolate or other material on the inside molds in such an efficient, speedy and uniform manner as to avoid the difficulties met with in the past and at the same time to avoid the use of complicated and expensive machinery which must, of course, be paid for by the ultimate consumer through an unnecessarily high price for the article produced. The invention also contemplates the coordination of the spreading and hardening steps in such a manner that the utmost of uniformity in the thickness of the walls of the article and consequently in the strength of the article produced is obtained and is rendered substantially independent of weather conditions and other circumstances attending the use of the process.

In accordance with the invention there is provided a rotatable mold-container or "barrel" adapted to be moved along a course while being rotated, as by being rolled thereon, and the provision of means for lifting first one side of the barrel and then the other so as to spread chocolate or other material about the insides of the molds contained in the barrel as the barrel is moved along the course while undergoing rotation. In certain of its aspects, moreover, the invention contemplates the provision of hardening means along the course, preferably along the latter portion thereof. In the case of chocolate or other material which is adapted to harden upon cooling, such hardening means may consist of a refrigerating unit. The invention, however, is also adapted for use in the forming of articles from fluid or semifluid materials which are capable of being hardened under the influence of heat, one example being paper pulp, which may spread itself about the inside of a mold while in a substantially liquid condition and may be dried and hardened thereon by the application of heat. In the case of such articles, the hardening means will consist of heating apparatus. It is accordingly to be understood that although the invention is particularly exemplified in connection with apparatus adapted for the formation of chocolate articles and including, in certain instances, refrigerating means, the invention contemplates the use of any type of hardening means, when desirable, to assist in, or to cause the hardening of the layer of material on the inside of the mold.

There are exemplified hereinafter various forms of barrels and types of apparatus providing courses for barrels, all of which, as will be understood, are adaptable and of ready modification and of the substitution of various modified forms, including not only the different forms shown, but also various other modifications, which may be used.

In Fig. 1 there is exemplified a rotatable container or barrel 20 having wheel portions 21 at its ends and being provided with a door 22 adapted to be opened to provide a doorway for the insertion of suitable molds 23, which, as will be understood, are formed in two parts, one of which is partially filled with chocolate or other suitable material, as indicated at 24.

On each of the wheel portions 21 there are provided a plurality of lugs or protuberances 25, the lugs on the respective wheel portions being provided in staggered relationship so that when the barrel is rotated, as by being moved along a floor or other suitable course, one end of the barrel and then the other will be lifted from the floor to laterally tilt the molds contained in the barrel alternately in opposite directions. For the purpose of conveniently rolling the barrel along a floor there is provided, in the present instance, traction means 26 from which there may extend a cable 27 which may be wound on a suitable reel.

Figure 3:
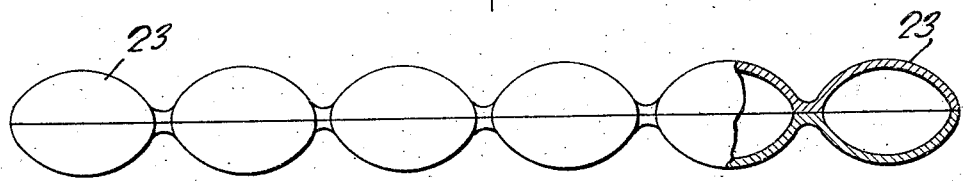
Fig. 3 is a side view of a mold of a type adapted to be contained in a rotatable container.

In operation the door 22 is opened and the barrel entirely or partially filled with a plurality of molds, which may be, as exemplified in Fig. 3, a longitudinally extended series of suitably shaped mold sections. These molds may be arranged in any convenient manner and do not ordinarily need to be carefully set in place. If there is not enough molds to fill the barrel a rolled piece of perforated sheet metal or wire mesh 28 may be placed within the empty space in the barrel. The door 22 is then closed and it is now only necessary to draw the barrel 20 along a course.

In the formation of articles of chocolate or the like, the operation may be conducted in its entirety in a somewhat chilled atmosphere, or the atmosphere may be progressively chilled as the rotation of the barrel continues. Preferably, however, the barrel is rotated in a relatively warm atmosphere and later in a chilled atmosphere, as by pulling the barrel toward and then through a refrigerating chamber, an operation which will be more particularly exemplified hereinafter.

Figure 5:
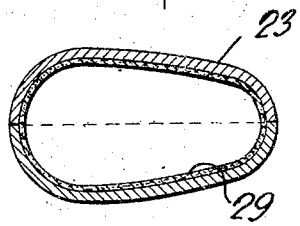
Fig. 5 is a sectional view of the mold showing the same after the chocolate has been spread about the same.

By such means the chocolate is distributed in an even layer on the inner walls of the molds and is solidified thereupon, as indicated at 29 in Fig. 5.

Figure 6:
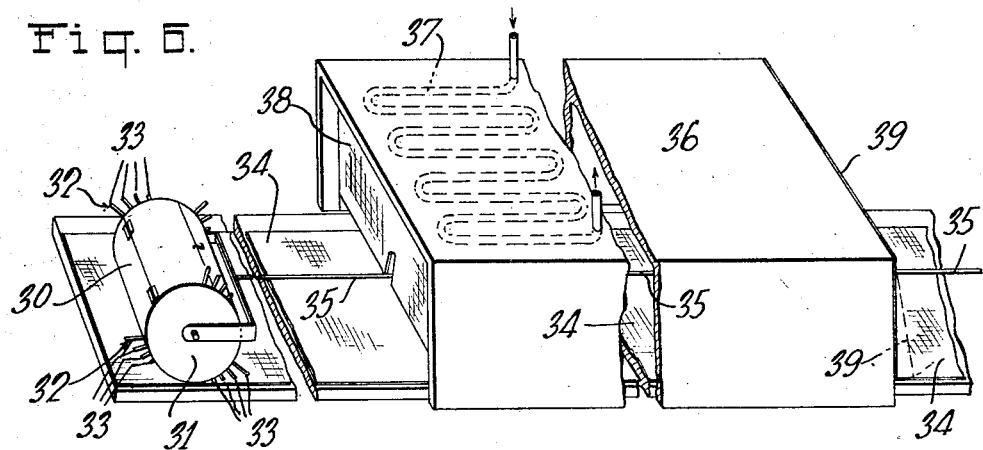
Fig. 6 is a side view of apparatus embodying the invention, the rotatable container exemplified being of a somewhat modified construction.

The form of apparatus exemplified in Fig. 6 comprises a barrel member 30 having on its wheel portions 31 protuberances 32 which, in the present instance, comprise a series of nails 33 of increasing length. These nails serve to grip the floor of the course over which the barrel rotates, which floor may be suitably provided by a canvas strip 34. The barrel 30 is adapted to be drawn, as by a cable 35, over the first portion of its course while exposed to a relatively warm temperature and then into and through a refrigerating chamber 36, containing suitable refrigerating means 37 and being provided with suitable front and rear flaps 38 and 39 which close after the entry and exit of the barrel, respectively. By providing refrigerating means only at the latter part of the course, the even and effective distribution of the chocolate or other material while the same is readily fluid is assured, the refrigerating means acting to chill the chocolate after it has been spread in a uniform layer about the inside of the mold. The continuation of the rotation and rocking movement of the barrel during its passage through the refrigerating means prevents the chocolate from settling in the mold after it has been spread about the inner walls of the same; and, moreover, effects a continuous spreading action of the inner portion of the chocolate after the outer layer has solidified on the surface of the mold. The number of rotations imparted to the barrel before it enters the refrigerating chamber may bear any desired relationship to the number of rotations while it is in the chamber. It has been found, however, that satisfactory results are secured when the total course is one and one-half times the length of the refrigerating unit.

Figure 7:
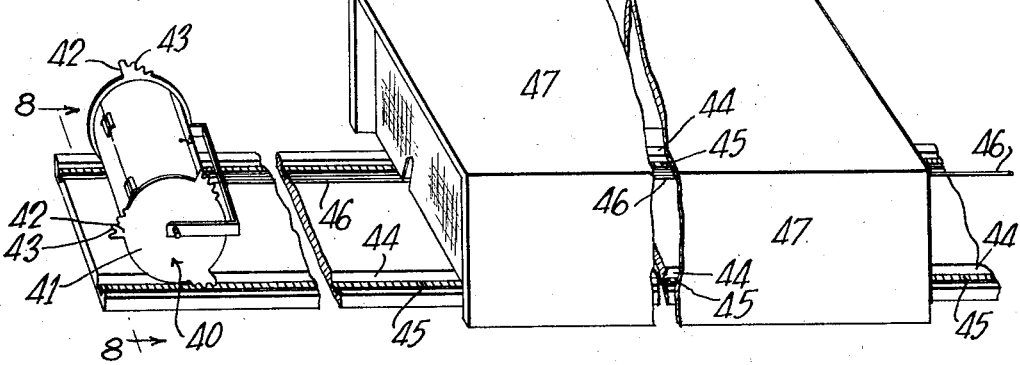
Fig. 7 is a side view of a somewhat modified form of apparatus.
Figure 8:
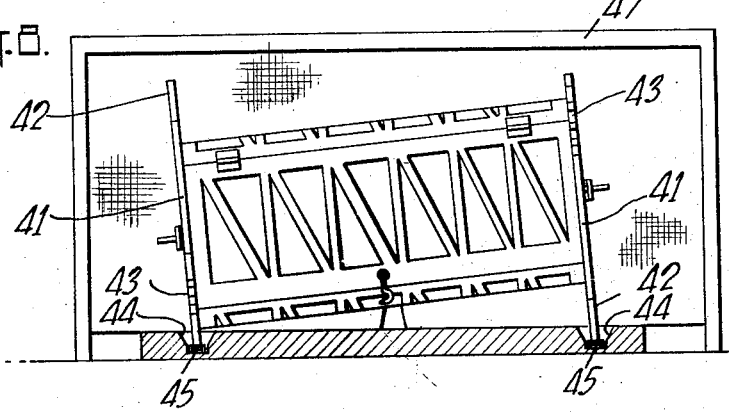
Fig. 8 is a sectional view along the line 8—8 of Fig. 7.

In Figs. 7 and 8 there is exemplified a form of apparatus wherein definite tracks provide the courses for wheel portions of a barrel such as shown at 40. The wheel portions 41 of this barrel have a somewhat greater diameter than the barrel proper and carry protuberances 42 having geared surfaces 43. The wheel portions 41 rest in tracks provided by channel-shaped members 44 in which there are disposed chains 45 with which the geared surfaces are adapted to mesh to assure an even movement of the wheel portions without likelihood of slipping. As in the foregoing exemplification the barrel is pulled along its course by a suitable cable, indicated at 46, and moved through a suitably equipped refrigerating unit 47.

Figure 9:
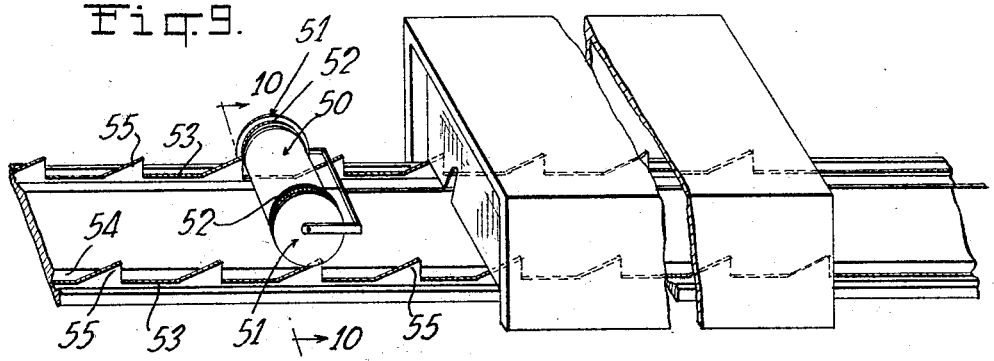
Fig. 9 is a side view showing still another modification.
Figure 10:
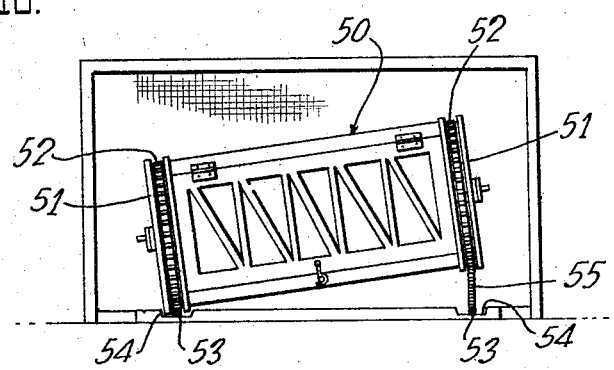
Fig. 10 is a sectional view along the line 10—10 of Fig. 9.

In Figs. 9 and 10 there is exemplified a form of apparatus wherein the barrel, exemplified in the present instance at 50, is provided with wheel portions 51 which are circular in shape and are not provided with staggered protuberances. The portions 51, however, are provided with geared surfaces 52 which mesh with the teeth of geared tracks 53 contained in channels 54. The tracks 53 are, in the present instance, provided with protuberances indicated at 55 which are arranged in staggered relationship and which operate to tilt the barrel in a manner similar to the protuberances on the barrel in the foregoing types of apparatus.

Figure 11:
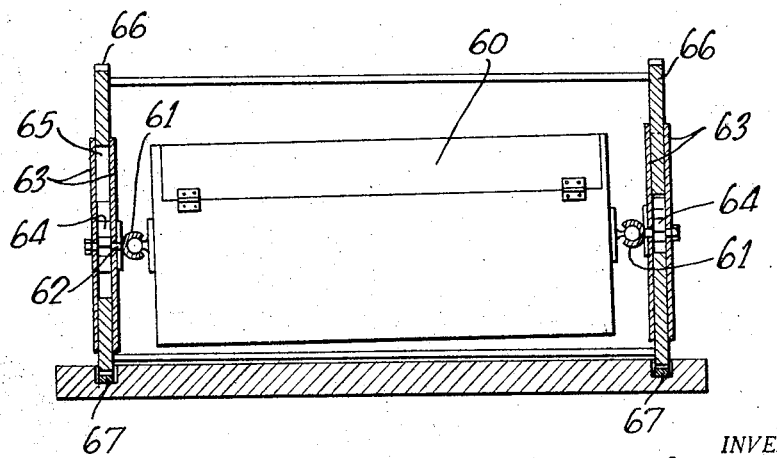
Fig. 11 is an end view of another type of rotatable container embodying the invention showing tracks therefor in cross-section.
Figure 12:
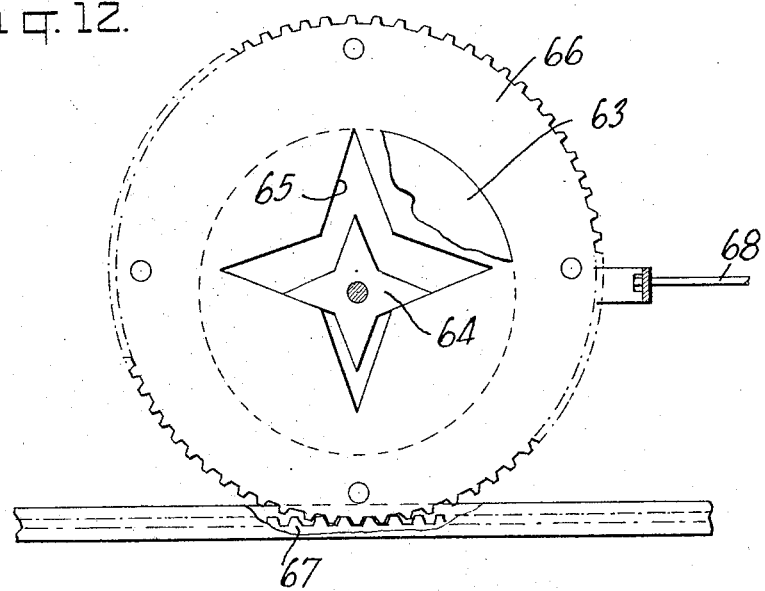
Fig. 12 is a side view thereof showing the tracks in side elevation.

In Figs 11 and 12 there is shown a form of apparatus wherein the tilting action of the barrel is secured by the use of rotatable guide members. In this exemplification the barrel 60 is suitably connected as by a socket 61 with shaft portions 62 carrying pairs of spaced discs 63. Between each pair of discs 63 is a small star-shaped wheel portion 64 which fits into a large star-shaped opening 65 in a rotatable guide member 66 held between the discs; it being understood that the points of the stars at each end of the barrel are staggered with respect to the points of the stars at the other end of the barrel. The rotatable guide members 66 are provided with gear surfaces meshing with teeth on tracks 67. As the barrel is rotated by means of a cable 68 and other suitable means, first one side of this barrel and then the other is lifted by the inwardly extending angles in a star-shaped opening and is thereafter permitted to drop toward a point of the star-shaped opening.

Figure 13:
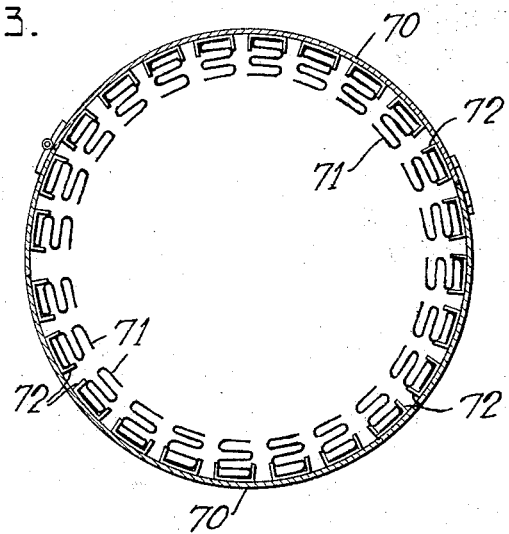
Fig. 13 is a sectional view of a barrel equipped with resilient means to receive the impact of molds contained therein.

In many instances it is desirable that the inside of the barrel be formed with means to take up the impact of the molds as the barrel drops after being lifted, and to this end there may be provided cushion members, one form of which is exemplified in Fig. 13. In this exemplification the interior of the cylindrical portion of the barrel 70, is provided with a plurality of springs 71, the lower ends of which may be closed by guards 72, if desired. By this means the impact of the molds as the barrel drops will be taken up, and there also will be imparted to the molds a certain joggling motion which assists in an even spreading of the chocolate or other material contained therein.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is to be understood that the term "rollable unit" as utilized herein to define the element exemplified by the barrel is intended to include members carrying one or more integral or separable molds as may suit the requirements of the particular case.

It is also to be understood that the following claims are intended to cover all of the generic and specific features of the invention herein described, and all statements of the scope of the invention which as a matter of language might be said to fall therebetween.

Having described our invention, what we claim as new and desire to secure by Letters Patent, is:

1. The method of making hollow articles, which comprises partially filling a mold with a fluid capable of hardening under changed heat conditions, rolling a unit carrying said mold first through a region having a temperature nearer the hardening temperature of said fluid than the temperature at which it is poured and alternately causing opposite ends of said unit to be temporarily lifted as it is rolled through said region, and thereupon rolling said unit through a region having a temperature further removed from the temperature at which it is poured, and alternately causing opposite ends of said unit to be temporarily lifted as it is rolled through the last-mentioned region.

2. The method of making hollow articles, which comprises partially filling a mold with a fluid capable of hardening under changed heat conditions, rolling a unit carrying said mold through a region having a temperature somewhat lower than the temperature at which it is poured, and thereafter through a second region having a temperature substantially lower than the temperature at which it is poured and adapted to cause a final hardening of said fluid, and alternately causing the opposite ends of said unit to be temporarily lifted as it is rolled through each of said regions.

3. The method of making hollow articles, which comprises partially filling a mold with a fluid capable of hardening under changed heat conditions, placing said mold in a mold-receiving unit, rolling said unit along a course first through a region having a temperature nearer the hardening temperature of said fluid than the tempeature at which it is poured, and next through a second region having a temperature adapted to cause a final hardening of said fluid, alternately causing the opposite ends of said unit to be temporarily lifted as it is rolled through each of said regions, removing said mold from said unit and removing said hardened material from said mold.

4. Apparatus for the formation of hollow articles in molds, comprising a course, a unit rollable along said course, and means for lifting one end of said unit and then the other to incline the axis of the unit first in one direction and then in the other as it rolls along said course.

5. Apparatus for the formation of hollow articles in molds, comprising a course, a mold-containing barrel adapted to be rolled along said course, and means for lifting one end of the barrel and then the other to incline the axis of the barrel first in one direction and then in the other as it rolls along said course.

6. Apparatus for the formation of hollow articles in molds, comprising a course, a mold-containing barrel adapted to be rolled along said course, means for lifting one end of the barrel and then the other to incline the axis of the barrel first in one direction and then in the other as it rolls along said course, and means to roll said barrel along said course.

7. Apparatus for the formation of hollow articles in molds, comprising a mold-containing barrel adapted to be rolled along a course, wheel portions at the ends of said barrel, means for guiding said wheel portions during the rotation of said barrel, and means to impart a lifting movement, first to one of said wheel portions and then to the other of said wheel portions, during the rotation of said barrel.

8. Apparatus for the formation of hollow articles in molds, comprising a course, a hardening unit enclosing a portion of said course, a mold-containing barrel adapted to be rolled along said course, and means for alternately lifting opposite ends of the barrel to incline the axis thereof successively in opposite directions as it rolls along said course.

9. Apparatus for the formation of hollow articles in molds, comprising a course, a hardening unit enclosing a portion of said course, a unit rollable along said course, means for rolling said rollable unit first toward and then through said hardening unit, and means for alternately lifting the ends of the rollable unit to incline the axis thereof successively in opposite directions during its movement along said course.

10. Apparatus for the formation of hollow articles in molds, comprising a course, a hardening unit enclosing a portion of said course, a mold-containing barrel adapted to be rolled along said course, means for rolling said barrel first toward and then through said hardening unit, and means for alternately lifting the ends of the barrel to incline the axis thereof successively in opposite directions during its movement along said course.

11. Apparatus for the formation of hollow articles in molds, comprising a rollable unit and a track, at least one of said elements being formed with staggered protuberances adapted to incline the axis of the unit first in one direction and then in the other during the movement of the unit along said track.

12. Apparatus for the formation of hollow articles in molds, comprising a barrel and a track, at least one of said elements being formed with staggered protuberances adapted to incline the axis of the barrel first in one direction and then in the other during the movement of the barrel along said track.

13. Apparatus for the formation of hollow articles in molds, comprising a rollable unit having spaced radial protuberances on its ends, the protuberances on opposite ends being staggered, whereby, as the unit is rolled, the opposite ends of the unit will alternately be lifted and dropped to assure a spreading of the fluid material about the inner mold walls.

14. Apparatus for the formation of hollow articles in molds, comprising a mold-containing barrel having spaced radial protuberances on its ends, the protuberances on opposite ends being staggered, whereby, as the barrel is rolled, the opposite ends of the barrel will alternately be lifted and dropped to assure a spreading about the inner walls of the molds of the fluid material within molds contained in the barrel.

15. Apparatus for the formation of hollow articles in molds, comprising a mold-containing barrel having spaced radical protuberances on its ends, the protuberances on opposite ends being staggered, whereby, as the barrel is rolled, the opposite ends of the barrel will alternately be lifted and dropped to assure a spreading about the inner walls of the molds of the fluid material within molds contained in the barrel, and means to roll said barrel along a course.

16. Apparatus for the formation of hollow articles in molds, comprising a mold-containing barrel having spaced radial protuberances on its ends, the protuberances on opposite ends being staggered, whereby, as the barrel is rolled, the opposite ends of the barrel will alternately be lifted and dropped to assure a spreading about the inner walls of the molds of the fluid material within molds contained in the barrel, the outer edges of said protuberances rising gradually from the periphery of the barrel in the direction of rotation.

17. Apparatus for the formation of hollow articles in molds, comprising a mold-containing barrel having spaced radial protuberances on its ends, the protuberances on opposite ends being staggered, whereby, as the barrel is rolled, the opposite ends of the barrel will alternately be lifted and dropped to assure a spreading about the inner walls of the molds of the fluid material within molds contained in the barrel, the outer edges of said protuberances being formed with gripping surfaces.

18. Apparatus for the formation of hollow articles in molds, comprising a course, a pair of chains extending longitudinally of said course, a barrel adapted to be moved along said course and to be rotated during such movement, said barrel being formed on its ends with spaced protuberances having gradually rising geared surfaces adapted to mesh with said chains, the protuberances on opposite ends of said barrel being staggered so that the axis of said barrel may be inclined first in one direction and then in the other during its movement along said course.

19. Apparatus for the formation of hollow articles in molds, comprising a track, a unit rollable along said track, a series of protuberances on each side of said track for lifting the ends of said unit as it moves along said track, said protuberances being staggered so as to raise one end of said unit and then the other as the same is rolled along said track.

20. Apparatus for the formation of hollow articles in molds, comprising a track, a barrel adapted to be moved along said track, a series of protuberances on each side of said track for lifting the ends of said barrel as it moves along said track, said protuberances being staggered so as to raise first one end of said barrel and then the other as the same is rolled along said track.

21. Apparatus for the formation of hollow articles in molds, comprising a barrel, a star-shaped wheel portion carried at each end of said barrel and rotatable guiding members formed with larger star-shaped openings receiving said star-shaped wheel members, said star-shaped members and openings at one end of the barrel and at the other being in staggered relationship so as to raise first one end of said barrel and then the other as said rotatable members are rotated.

22. Apparatus for the formation of hollow articles in molds, comprising a course, a member adapted to be rotated as the same is moved along said course, mold-containing means adapted to be rotated when said rotatable member is moved along said course, and means to impart to the mold-containing means alternate tipping movements first in one lateral direction and then in the other as the mold-containing means is rotated.

23. Apparatus for the formation of hollow articles in molds, comprising a course, a hardening unit enclosing a portion of said course, a member adapted to be rotated as the same is moved toward and through said hardening unit, mold-containing means adapted to be rotated when said rotatable member is so moved, and means to impart to said mold-containing means alternate tipping movements first in one lateral direction and then in the other as the mold-containing means is rotated.

24. Apparatus for the formation of hollow articles in molds, comprising a course, a mold-containing barrel adapted to be rolled along said course, and means for gradually lifting one end of the barrel and permitting it to drop suddenly at certain periods in its operation and for gradually lifting the other end of the barrel and permitting it to drop suddenly at intermediate periods in its operation, for alternately throwing material in the molds first toward one side and then toward the other side as the barrel rolls along said course.

25. Apparatus for the formation of hollow articles in molds, comprising a course, a mold-containing barrel adapted to be rolled along said course, means for lifting one end of the barrel and then the other to incline the axis of the barrel first in one direction and then in the other as it rolls along said course, and resilient means on the inner cylindrical surface of said barrel for yieldably receiving the impact of the molds contained therein when one end of the barrel drops.

26. Apparatus for the formation of hollow articles in molds, comprising a pair of tracks, molds, a container adapted to contain said molds, and wheel portions at the end of said container adapted for guiding said container along said tracks, said tracks having a series of staggered irregularities, said irregularities adapted for varying the position of one portion of said container with respect to another portion of said container to incline each axis of said molds from the horizontal as said container rolls along said tracks.

27. Apparatus for the formation of hollow articles in molds, comprising a pair of tracks, molds, a container adapted to contain said molds, and wheel portions at the end of said container adapted for guiding said container along said tracks, at least one of said tracks having a series of irregularities, said irregularities adapted for varying the position of one portion of said container with respect to another portion of said container to incline each axis of said molds from the horizontal as said container rolls along said tracks.

28. Apparatus for the formation of hollow articles in molds, comprising a pair of tracks, molds, a container adapted to contain said molds, wheel portions at the end of said container adapted for guiding said container along said tracks, said tracks having a series of staggered irregularities, said irregularities adapted for varying the position of one portion of said container with respect to another portion of said container to incline each axis of said molds from the horizontal as said container rolls along said tracks, and a hardening unit enclosing a portion of said tracks.

29. Apparatus for the formation of hollow articles in molds, comprising a hardening unit, a mold-containing barrel, means to move said barrel through said hardening unit, means for alternately lifting opposite ends of said barrel to incline an axis thereof successively in opposite directions as it is rotated during such movement.

30. Apparatus for the formation of hollow articles in molds, comprising a hardening unit, mold-containing barrel, means to move said barrel first toward and then through said hardening unit, means for alternately lifting opposite ends of said barrel to incline an axis thereof successively in opposite directions as it is rotated during such movement.

31. Apparatus for the formation of hollow articles in molds, comprising a mold-containing barrel, a track for said barrel, a hardening unit extending over a portion of said track, and means to roll said barrel along said track, said track being formed to incline the axis of said barrel from the horizontal first in one direction and then in the other during such movement.

In testimony whereof we affix our signatures.

DAVID LANTINBERG.
FRANK STEFANDEL.